US012712648B2

(12) United States Patent
Kang et al.

(10) Patent No.: US 12,712,648 B2
(45) Date of Patent: Aug. 18, 2026

(54) METHODS OF SENDING UE SCREAMING SIGNAL IN PRIVATE NETWORKS WITH LOCAL LICENSED SPECTRUM

(71) Applicant: Telefonaktiebolaget LM Ericsson (publ), Stockholm (SE)

(72) Inventors: Du Ho Kang, Sollentuna (SE); Muhammad Kazmi, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 695 days.

(21) Appl. No.: 17/925,678

(22) PCT Filed: May 18, 2020

(86) PCT No.: PCT/SE2020/050510

§ 371 (c)(1),
(2) Date: Nov. 16, 2022

(87) PCT Pub. No.: WO2021/235984

PCT Pub. Date: Nov. 25, 2021

(65) Prior Publication Data

US 2023/0199855 A1 Jun. 22, 2023

(51) Int. Cl.
*H04B 17/336* (2015.01)
*H04W 74/08* (2009.01)
(Continued)

(52) U.S. Cl.
CPC ...... *H04B 17/336* (2015.01); *H04W 74/0833* (2013.01); *H04W 74/0866* (2013.01); *H04W 74/0836* (2024.01)

(58) Field of Classification Search
CPC ......... H04W 74/0833; H04W 74/0866; H04W 72/21; H04W 74/0836; H04W 74/004;
(Continued)

(56) References Cited

U.S. PATENT DOCUMENTS

2014/0221030 A1 8/2014 Fujii et al.
2019/0104546 A1 4/2019 Chendamarai Kannan et al.
(Continued)

FOREIGN PATENT DOCUMENTS

CN 103052108 A * 4/2013
WO WO-2020034319 A1 * 2/2020 .......... H04W 74/002

OTHER PUBLICATIONS

International Search Report and Written Opinion dated Feb. 15, 2021 for International Application No. PCT/SE2020/050510 filed May 18, 2020; consisting of 8 pages.
(Continued)

*Primary Examiner* — Gary Mui
(74) *Attorney, Agent, or Firm* — Sage Patent Group

(57) ABSTRACT

A system, wireless device and network node for managing interference from aggressor private networks are provided. According to one or more embodiments, a wireless device that is configured to communicate with a serving network node is provided. The wireless device includes processing circuitry configured to cause transmission of random access (RA) signaling to a first network node where the RA signaling is configured to indicate that the first network node is causing interference at the wireless device.

19 Claims, 8 Drawing Sheets

(51) Int. Cl.
*H04W 74/0833* (2024.01)
*H04W 74/0836* (2024.01)

(58) Field of Classification Search
CPC ............... H04W 72/541; H04B 17/336; H04B 2215/00
See application file for complete search history.

(56) References Cited

U.S. PATENT DOCUMENTS

| | | | | |
|---|---|---|---|---|
| 2021/0112590 | A1* | 4/2021 | Kim | H04W 72/0446 |
| 2021/0266778 | A1* | 8/2021 | Cao | H04L 5/0035 |
| 2021/0410081 | A1* | 12/2021 | Xu | H04J 11/0056 |
| 2022/0095240 | A1* | 3/2022 | Ying | H04B 17/336 |

OTHER PUBLICATIONS

Communication pursuant to Article 94(3) EPC mailed Mar. 17, 2025 for European Patent Application No. 20728832.5, 6 pages.

* cited by examiner

Receive transmission of random access (RA) signaling from a wireless device where the RA signaling is configured to indicate that the first network node is causing interference at the wireless device
S100

Cause an action to reduce the interference based on the indication that the first network node is causing interference
S102

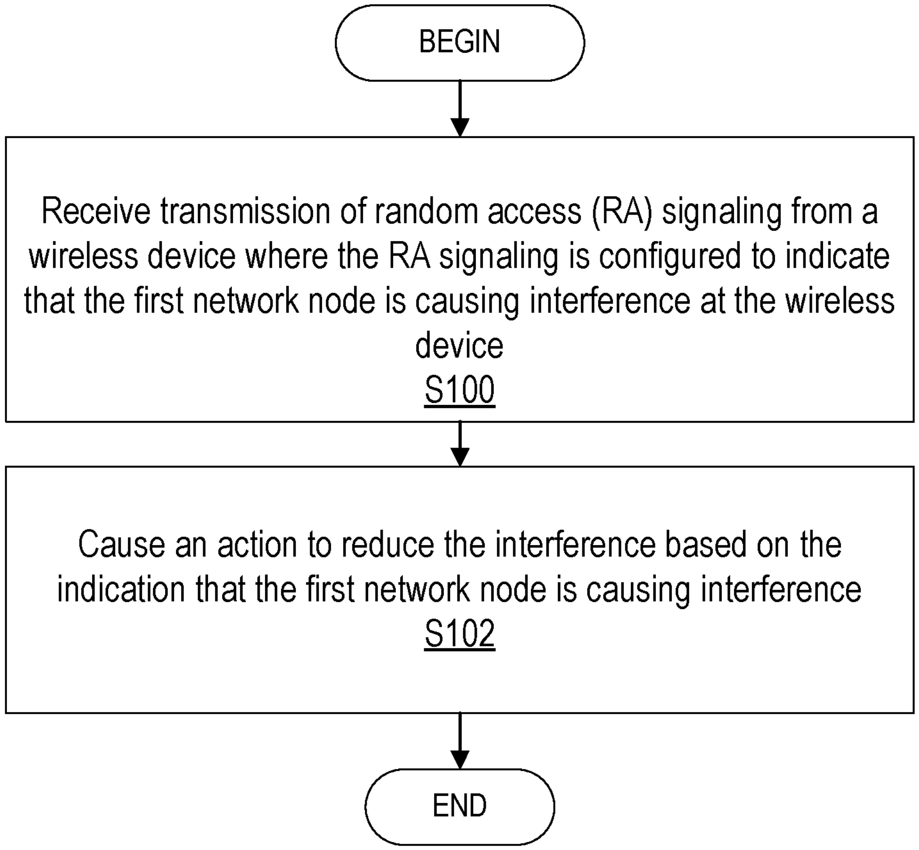

FIG. 5

Transmit random access (RA) signaling to a first network node where the RA signaling is configured to indicate that the first network node is causing interference at the wireless device
S104

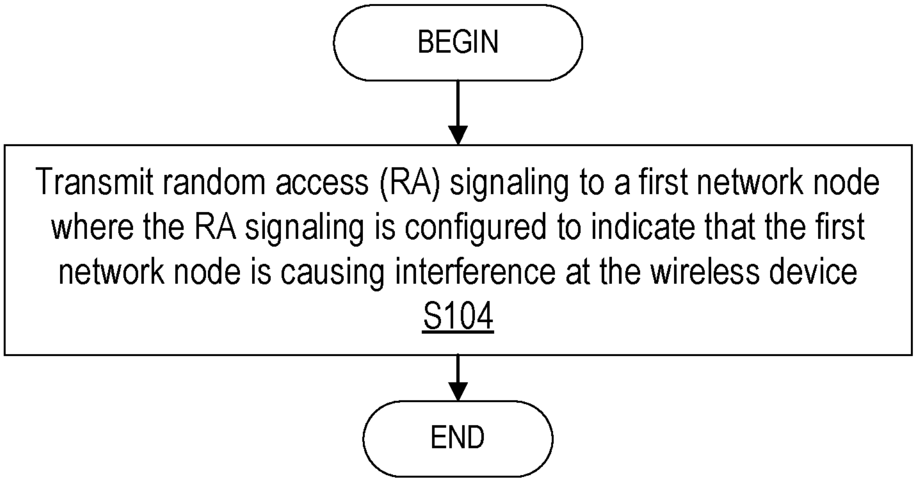

FIG. 6

METHODS OF SENDING UE SCREAMING SIGNAL IN PRIVATE NETWORKS WITH LOCAL LICENSED SPECTRUM

CROSS-REFERENCE TO RELATED APPLICATIONS

This application is a Submission Under 35 U.S.C. § 371 for U.S. National Stage Patent Application of International Application Number: PCT/SE2020/050510, filed May 18, 2020 entitled "METHODS OF SENDING UE SCREAMING SIGNAL IN PRIVATE NETWORKS WITH LOCAL LICENSED SPECTRUM," the entirety of which is incorporated herein by reference.

TECHNICAL FIELD

Wireless communication and in particular, to managing interference from aggressor private networks.

BACKGROUND

While most new spectrum for fifth generation (5G, also referred to as New Radio (NR)) is expected to be licensed spectrum for traditional wide area coverage, a limited portion of the spectrum may be set aside for licensing according to the needs of local demanding "Verticals" and their services. More and more countries, e.g., UK, Germany, Japan, have decided to release local licensed spectrum where each private network has a dedicated spectrum in a specific area. An example of Japanese and UK local licensed spectrum allocation are illustrated in FIG. 1.

Downlink interference management problems in the local licensed spectrum are more challenging when compared to a traditional single operator multi-cell network. A first reason for this is that a number of private local networks reuse the same frequency channel within an interference range. The second reason is that private networks have closed access, which block access from wireless devices belonging to the other network, leading to possibly an unreasonably low signal to interference ratio.

There are several existing methods for addressing these challenges with local licensed spectrum. One way is a fully distributed solution based on a local measurement. In particular, existing interference cancellation (IC) at the wireless device may be based on complete blind decoding of channels in aggressor cells. The limitation of this blind-decoding based IC is that not all wireless device types support such receiver that can perform such blind-decoding. Further, the wireless device receivers that can support such blind-decoding tend to be very complicated, expensive and increase wireless device power consumption.

Another distributed solution is to employ listen before talk (LBT) mechanisms that are used in the unlicensed spectrum, which is scalable without any explicit signaling across private networks. However, this does not have the capability to differentiate interfering nodes from its own network and from other networks, leading to spectral inefficiency and increases delay in accessing the channel for operation. Another solution is to provide for explicit signaling via a wire-line interface, e.g., traditional inter-cell interference (ICIC) coordination or the Spectrum Access System (SAS) in CBRS spectrum. This allows explicit signaling but will be very limited when a private network deployment is uncertain or when a central coordination architecture is not mandatory by regulations.

As such, applying existing solutions to interference management in a local license spectrum suffers from one or more of the issues, some of which are discussed above.

SUMMARY

Some embodiments advantageously provide a method and system for managing interference from aggressor private networks.

To help reduce and/or prevent and/or mitigate interference, at a victim wireless device, from network nodes belonging to one or more aggressor private networks operating on the interfering frequency resources, a mechanism/process/method in the wireless device is provided in order to enable the wireless device to establish a connection with and/or at least notify at least one aggressor network node of at least one aggressor private network. The connection that is establish is enabled by the victim wireless device sending a screaming signal to the aggressor cell. Establishing a connection may correspond to one or more one way transmissions and/or to bi-directional transmission between the victim wireless device and one or more aggressor network nodes. The screaming signals include at least basic coordination information for enabling the aggressor cell to reduce or mitigate or avoid interference at the victim wireless device. More specifically, as shown in FIG. 2, the wireless device transmits the screaming signal towards an aggressor cell in a private network in the interfering frequency channel.

According to one aspect of the disclosure, a wireless device that is configured to communicate with a serving network node is provided. The wireless device includes processing circuitry that is configured to cause transmission of random access (RA) signaling to a first network node where the RA signaling is configured to indicate that the first network node is causing interference at the wireless device.

According to one or more embodiments, the processing circuitry is further configured to receive, from the serving network node, a message triggering the transmission of the RA signaling to the first network node where the message includes an identifier associated with the first network node. According to one or more embodiments, the processing circuitry is further configured to: autonomously monitor a signal reception from the first network node, and determine whether the signal reception meets an aggressor criterion. The transmission of RA signaling to the first network node is based on the signal reception meeting the aggressor criterion.

According to one or more embodiments, the processing circuitry is further configured to: receive, from the serving network node, a message that triggers monitoring of signal reception associated with the first network node; monitor the signal reception from the first network node based on the message; and determine whether the signal reception meets an aggressor criterion based on the monitoring of the signal reception where the transmission of RA signaling to the first network node is based on the signal reception meeting the aggressor criterion.

According to one or more embodiments, the aggressor criterion includes an interference level where the aggressor criterion is met if the interference level is met. The interference level is met or is fulfilled provided one or more conditions or criteria related to interference is met. Examples of such conditions are: power of the interference signal (Ip) received at the wireless device is above interference threshold (It); received signal quality (Q) at the wireless device is below signal quality threshold (Qt); Error rate (R) of received signal at the wireless device is above error rate threshold (Rt). The parameters, Ip, Q and R may also be called as performance metric which indicates the amount or level of interference received at the wireless device. Ip may correspond to received power of at least the signals received from the first network node. Q may correspond to quality of received signal from the serving network node of the wireless device. Examples of Q are SNR, SINR, reference signal received quality (RSRQ) etc. Higher interference level leads to lower Q and vice versa. R may correspond to error rate of signal received from the serving network node. Examples of error rate are block error rate (BLER), frame error rate (FER), number of NACK transmitted by the wireless device in response to certain number of received data blocks from the serving network node, fraction of NACK with respect to a total number of ACK and NACK transmitted by the wireless device in response to certain number of received data blocks from the serving network node etc. Higher interference level leads to higher R and vice versa.

According to one or more embodiments, the monitoring includes monitoring of a plurality of signal receptions associated with of a plurality of network nodes including the first network node. The processing circuitry is further configured to: determine that each of the plurality of signal receptions meets the aggressor criterion; and cause transmission of RA signaling to each of the plurality of network nodes. The RA signaling is configured to: indicate that the plurality of network nodes are causing interference; and be used by each of the plurality of network nodes to determine whether to perform an action to reduce the interference. According to one or more embodiments, the RA signaling corresponds to one of physical random access channel, PRACH, signaling and physical uplink channel signaling in a RA process. Examples of physical uplink channels are physical uplink data channel, physical uplink control channel (PUCCH) etc. Example of physical uplink date channel is a physical uplink shared channel, PUSCH.

According to one or more embodiments, the RA process is one of a 2-step RA process and 4-step RA process. According to one or more embodiments, an acknowledgement step for acknowledging the one of PRACH signaling and PUSCH signaling in the RA process is skipped. According to one or more embodiments, a last step of one of the 2-step RA process and 4-step RA process is skipped. According to one or more embodiments, the RA signaling includes at least one of a cell identifier of the first network node and resource coordination information for interference mitigation. The resource coordination information for interference mitigation includes one of: information of a set of radio resources over which interference is received from the first network node; information of a set of radio resources over which the first network node is recommended to reduce interference toward the wireless device; and information of a time period over which the wireless device is expected to be served, by the serving network node, on a set of radio resources.

According to one or more embodiments, the wireless device in not in a radio resource control (RRC) connected state with the first network node. According to one or more embodiments, the RA signaling is configured to be used by the first network node to determine whether to perform an action to reduce the interference. According to one or more embodiments, the transmission is to the first network node is a direct transmission to the first network node.

According another aspect of the disclosure, a first network node is provided. The first network node includes processing circuitry configured to: receive transmission of random access (RA) signaling from a wireless device where the RA signaling is configured to indicate that the first network node is causing interference at the wireless device; and cause an action to reduce the interference based on the indication that the first network node is causing interference.

According to one or more embodiments, the processing circuitry is further configured to identify a cause of the interference based at least in part on the RA signaling where the action is based on the identified cause of the interference. According to one or more embodiments, the action includes one of: adapting transmission on a plurality of resources; adapting a frequency of allocation of a plurality of resources in one of a time domain and frequency domain; and adapting transmission on a plurality of resources over a time period. According to one or more embodiments, the RA signaling indicates that a plurality of network nodes are causing interference at the wireless device where the plurality of network nodes includes the first network node.

According to one or more embodiments, the RA signaling corresponds to one of physical random access channel, PRACH, and physical uplink shared channel, PUSCH, signaling in a RA process. According to one or more embodiments, the RA process is one of a 2-step RA process and 4-step RA process. According to one or more embodiments, the processing circuitry is further configured to skip an acknowledgement step for acknowledging the one of PRACH signaling and PUSCH signaling in the RA process. According to one or more embodiments, the processing circuitry is further configured to skip a last step of one of the 2-step RA process and 4-step RA process. According to one or more embodiments, the wireless device in not in a radio resource control (RRC) connected state with the first network node.

According to another aspect of the disclosure, a method for a wireless device that is configured to communicate with a serving network node is provided. Random access (RA) signaling is transmitted to a first network node where the RA signaling configured to indicate that the first network node is causing interference at the wireless device.

According to one or more embodiments, a message triggering the transmitting of the RA signaling to the first network node is received from the serving network node where the message includes an identifier associated with the first network node. According to one or more embodiments, a signal reception from the first network node is autonomously monitored, and a determination is performed whether the signal reception meets an aggressor criterion where the transmitting of RA signaling to the first network node is based on the signal reception meeting the aggressor criterion. According to one or more embodiments, a message that triggers monitoring of signal reception associated with the first network node is received from the serving network node, the signal reception from the first network node is monitored based on the message, and a determination is performed whether the signal reception meets an aggressor criterion based on the monitoring of the signal reception where the transmitting of RA signaling to the first network node is based on the signal reception meeting the aggressor criterion.

According to one or more embodiments, the aggressor criterion includes an interference level, the aggressor criterion being met if the interference level is met. According to one or more embodiments, the interference level is met when the following one or more conditions are met: power of the interference signal received at the wireless device is above interference threshold, received signal quality at the wireless device is below signal quality threshold, and error rate of received signal at the wireless device is above error rate threshold. According to one or more embodiments, the monitoring includes monitoring of a plurality of signal receptions associated with of a plurality of network nodes including the first network node. A determination is performed that each of the plurality of signal receptions meets the aggressor criterion. RA signaling is transmitted to each of the plurality of network nodes. The RA signaling is configured to: indicate that the plurality of network nodes are causing interference; and be used by each of the plurality of network nodes to determine whether to perform an action to reduce the interference. According to one or more embodiments, the RA signaling corresponds to one of physical random access channel, PRACH, signaling and uplink data channel signaling in a RA process.

According to one or more embodiments, the RA process is one of a 2-step RA process and 4-step RA process. According to one or more embodiments, an acknowledgement step for acknowledging the one of PRACH signaling and PUSCH signaling in the RA process is skipped. According to one or more embodiments, a last step of one of the 2-step RA process and 4-step RA process is skipped. According to one or more embodiments, the RA signaling includes at least one of a cell identifier of the first network node and resource coordination information for interference mitigation. The resource coordination information for interference mitigation includes one of: information of a set of radio resources over which interference is received from the first network node; information of a set of radio resources over which the first network node is recommended to reduce interference toward the wireless device; and information of a time period over which the wireless device is expected to be served, by the serving network node, on a set of radio resources.

According to one or more embodiments, the wireless device in not in a radio resource control (RRC) connected state with the first network node. According to one or more embodiments, the RA signaling is configured to be used by the first network node to determine whether to perform an action to reduce the interference. According to one or more embodiments, the transmitting of RA signaling to the first network node is a direct transmission to the first network node.

According to another aspect of the disclosure, a method implemented in a first network node is provided. Transmission of random access (RA) signaling is received from a wireless device where the RA signaling is configured to indicate that the first network node is causing interference at the wireless device. An action to reduce the interference is cased based on the indication that the first network node is causing interference.

According to one or more embodiments, identifying a cause of the interference is identified based at least in part on the RA signaling where the action being based on the identified cause of the interference. According to one or more embodiments, the action includes one of: adapting transmission on a plurality of resources; adapting a frequency of allocation of a plurality of resources in one of a time domain and frequency domain; and adapting transmission on a plurality of resources over a time period. According to one or more embodiments, the RA signaling indicates that a plurality of network nodes are causing interference at the wireless device, the plurality of network nodes including the first network node.

According to one or more embodiments, the RA signaling corresponds to one of physical random access channel, PRACH, and uplink data channel signaling in a RA process.

According to one or more embodiments, the RA process is one of a 2-step RA process and 4-step RA process. According to one or more embodiments, an acknowledgement step for acknowledging the one of PRACH signaling and PUSCH signaling in the RA process is skipped. According to one or more embodiments, a last step of one of the 2-step RA process and 4-step RA process is skipped. According to one or more embodiments, the wireless device in not in a radio resource control (RRC) connected state with the first network node.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 5 is a flowchart of an exemplary process in a network node according to some embodiments of the present disclosure;

FIG. 6 is a flowchart of an exemplary process in a wireless device according to some embodiments of the present disclosure;

DETAILED DESCRIPTION

Figure 1:
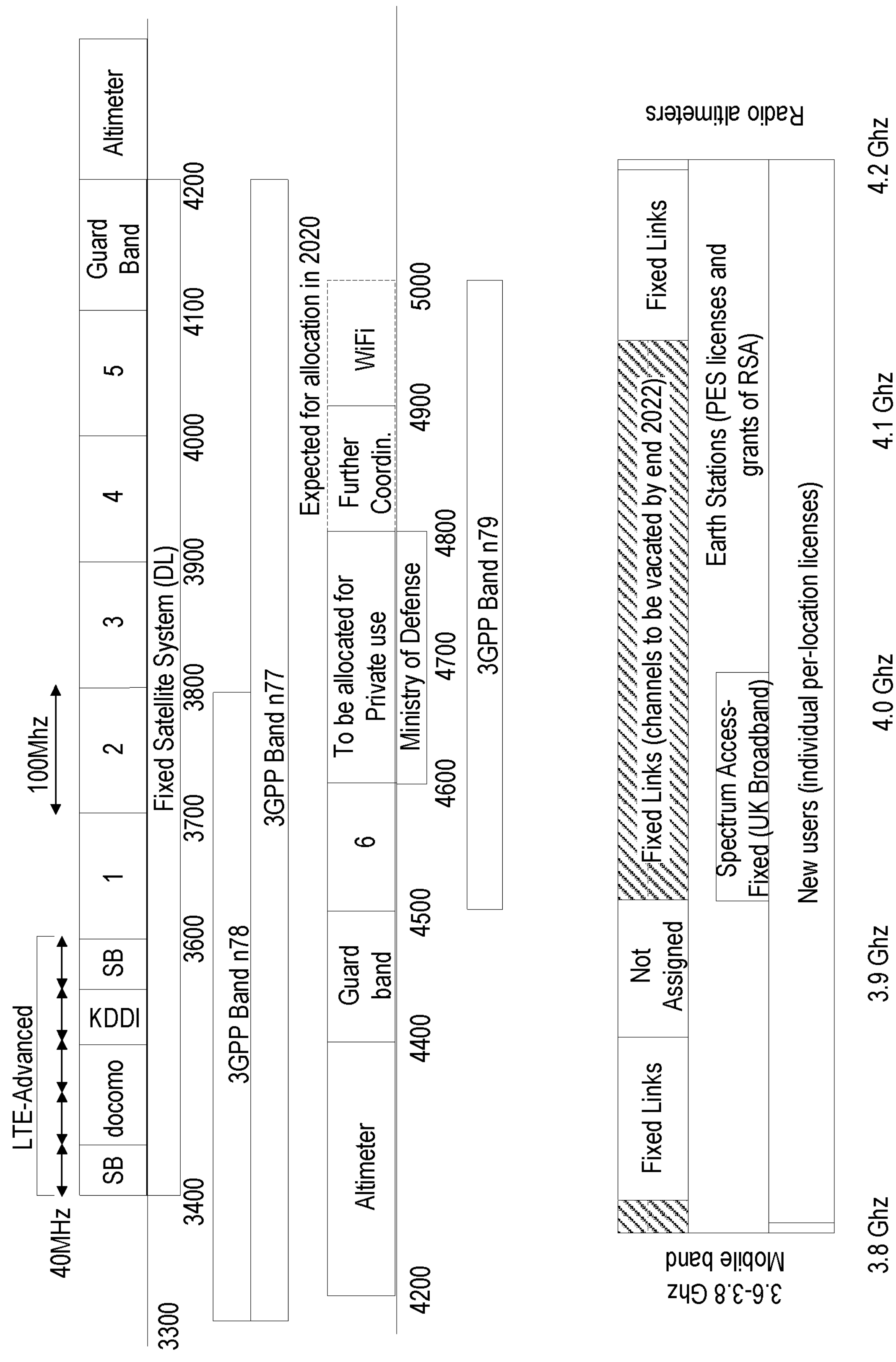
FIG. 1 is a diagram of existing spectrum allocation for local licensed spectrum for private use in a mid-band.
Figure 2:
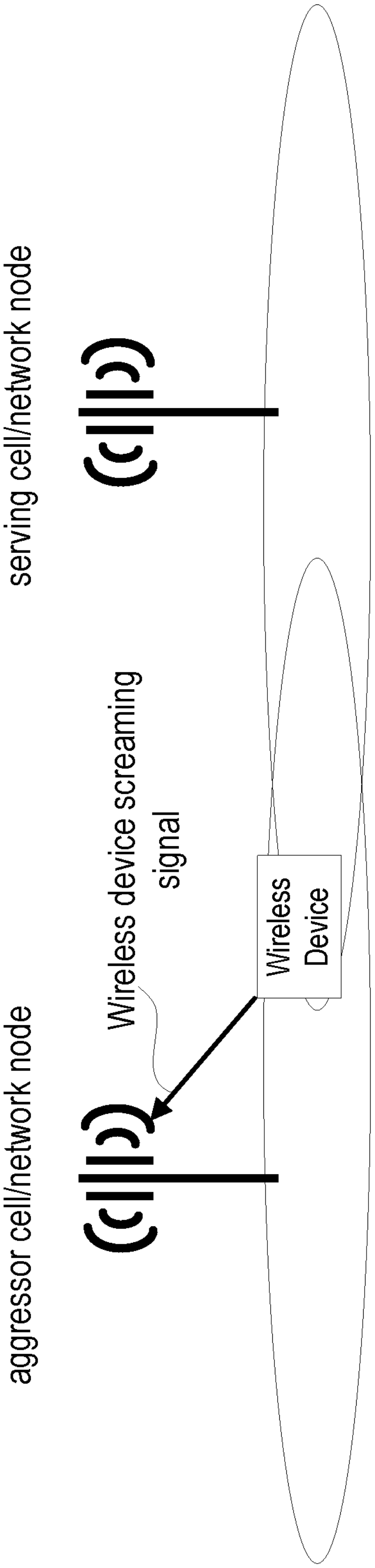
FIG. 2 is a diagram of a system for communicating a screaming signal in accordance with the principles of the present disclosure.

As discussed above, applying existing solutions to interference management in a local license spectrum suffers from one or more of the issues, some of which are discussed above. The instant disclosure solves at least a portion of at least one of at least one of the problems/issues described above in part by providing new scalable methods and explicit signaling without support of an architecture, thereby allowing for mitigation of private interference issues in local licensed spectrum. In one or more embodiments, one or more methods are provided to address downlink interference issues among private networks in co-/adj-channel frequencies. It may be assumed that TDD synchronization is made as, in the real world, private network owners may be able to generally agree to the TDD pattern via offline agreement. Further, uplink interference management is out of scope of the instant disclosure.

Before describing in detail exemplary embodiments, it is noted that the embodiments reside primarily in combinations of apparatus components and processing steps related to managing interference from aggressor private networks. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information.

A cell may be generally a communication cell, e.g., of a cellular or mobile communication network, provided by a node. A serving cell may be a cell on or via which a network node (the node providing or associated to the cell, e.g., base station, gNB or eNodeB) transmits and/or may transmit data (which may be data other than broadcast data) to a user equipment, in particular control and/or user or payload data, and/or via or on which a user equipment transmits and/or may transmit data to the node; a serving cell may be a cell for or on which the wireless device is configured and/or to which it is synchronized and/or has performed an access procedure, e.g., a random access procedure, and/or in relation to which it is in a RRC_connected or RRC_idle state, e.g., in case the node and/or user equipment and/or network follow the LTE-standard. An aggressor cell may be a cell for which the wireless device's state with respect to the aggressor cell is not a RRC_connected state and RRC_idle state. One or more carriers (e.g., uplink and/or downlink carrier/s and/or a carrier for both uplink and downlink) may be associated to a cell.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g., for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 3:
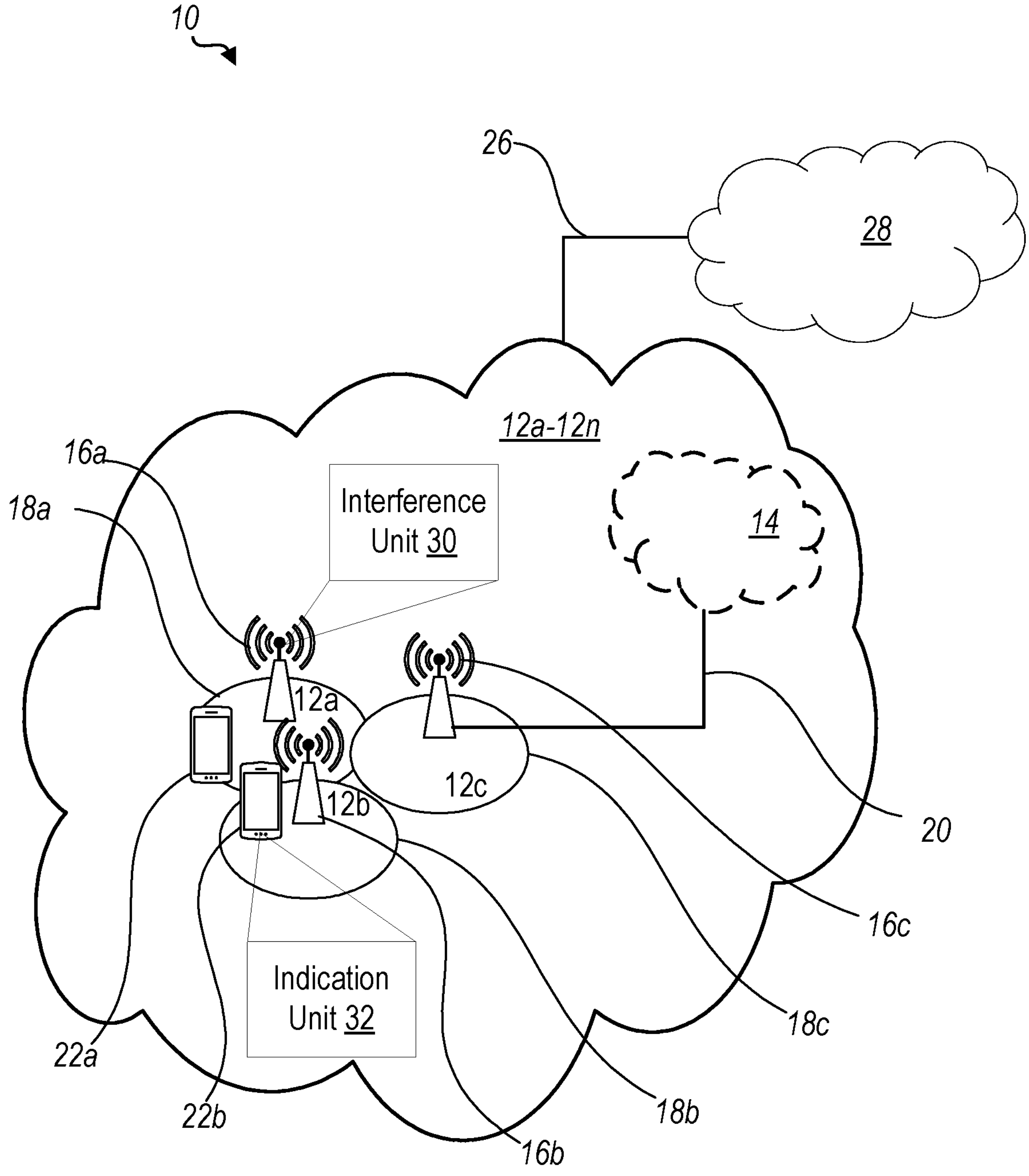
FIG. 3 is a schematic diagram of an exemplary network architecture illustrating a communication system according to the principles in the present disclosure.

Embodiments provide managing interference from aggressor private networks. Referring again to the drawing figures, in which like elements are referred to by like reference numerals, there is shown in FIG. 3 a schematic diagram of a communication system 10, according to an embodiment, such as a 3GPP-type cellular network that may support standards such as LTE and/or NR (5G), which comprises an one or more access networks 12*a*-12*n* (collectively referred to as access network 12), such as a radio access network(s), private network(s) and a core network 14. In one example, private access networks 12*a*, 12*b* and 12*c* each provide respective private networks using local licensed spectrum as described herein. The access network 12 comprises a plurality of network nodes 16*a*, 16*b*, 16*c* (referred to collectively as network nodes 16), such as NBs, eNBs, gNBs or other types of wireless access points, each defining a corresponding coverage area 18*a*, 18*b*, 18*c* (referred to collectively as coverage areas 18 and/or cell 18). Each network node 16*a*, 16*b*, 16*c* is connectable to the core network 14 over a wired or wireless connection 20. A first wireless device (WD) 22*a* located in coverage area 18*a* is configured to wirelessly connect to, or be paged by, the corresponding network node 16*a*. A second WD 22*b* in coverage area 18*b* is wirelessly connectable to the corresponding network node 16*b*. While a plurality of WDs 22*a*, 22*b* (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can be in communication with a serving network node and may also be configured to transmit a screaming signal to an aggressor network node where the wireless device 22 is not in radio resource control (RRC) connected mode with the aggressor network node at least during transmission of the screaming signal.

The intermediate network 28 may be one of, or a combination of more than one of, a public, private or hosted network. The intermediate network 28, if any, may be a backbone network or the Internet. In some embodiments, the intermediate network 28 may comprise two or more subnetworks (not shown).

The communication system of FIG. 3 as a whole enables connectivity between one of the connected WDs 22*a*, 22*b* and the network node 16.

A network node 16 is configured to include an interference unit 30 which is configured to perform one or more network node 16 functions as described herein such as with respect managing interference from aggressor private networks. A wireless device 22 is configured to include an indication unit 32 which is configured perform one or more wireless device 22 functions as described herein such as with respect to managing interference from aggressor private networks.

Example implementations, in accordance with an embodiment, of the WD 22 and network node 16 discussed in the preceding paragraphs will now be described with reference to FIG. 4. The communication system 10 includes a network node 16 provided in a communication system 10 and including hardware 31 enabling it to communicate with one or more of WD 22 and other network nodes 16. The hardware 31 may include a communication interface 34 for setting up and maintaining a wired or wireless connection with an interface of a different communication device of the communication system 10, as well as a radio interface 36 for setting up and maintaining at least a wireless connection 37 with a WD 22 located in a coverage area 18 served by the network node 16. The radio interface 36 may be formed as or may include, for example, one or more RF transmitters, one or more RF receivers, and/or one or more RF transceivers. The communication interface 34 may be configured to facilitate a connection one or more other network nodes 16 (i.e., backhaul connection) and/or may be direct or it may pass through a core network 14 of the communication system 10 and/or through one or more intermediate networks 28 outside the communication system 10.

In the embodiment shown, the hardware 31 of the network node 16 further includes processing circuitry 38. The processing circuitry 38 may include a processor 40 and a memory 42. In particular, in addition to or instead of a processor, such as a central processing unit, and memory, the processing circuitry 38 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 40 may be configured to access (e.g., write to and/or read from) the memory 42, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 44 stored internally in, for example, memory 42, or stored in external memory (e.g., database, storage array, network storage device, etc.) accessible by the network node 16 via an external connection. The software 44 may be executable by the processing circuitry 38. The processing circuitry 38 may be configured to control any of the methods and/or processes described herein and/or to cause such methods, and/or processes to be performed, e.g., by network node 16. Processor 40 corresponds to one or more processors 40 for performing network node 16 functions described herein. The memory 42 is configured to store data, programmatic software code and/or other information described herein. In some embodiments, the software 44 may include instructions that, when executed by the processor 40 and/or processing circuitry 38, causes the processor 40 and/or processing circuitry 38 to perform the processes described herein with respect to network node 16. For example, processing circuitry 38 of the network node 16 may include interference unit 30 configured to perform one or more network node 16 functions as described herein such as with respect to managing interference from aggressor private networks.

The communication system 10 further includes the WD 22 already referred to. The WD 22 may have hardware 46 that may include a radio interface 48 configured to set up and maintain a wireless connection 37 with a network node 16 serving a coverage area 18 in which the WD 22 is currently located. The radio interface 48 may be formed as or may include, for example, one or more RF transmitters, one or more RF receivers, and/or one or more RF transceivers.

The hardware 46 of the WD 22 further includes processing circuitry 50. The processing circuitry 50 may include a processor 52 and memory 54. In particular, in addition to or instead of a processor, such as a central processing unit, and memory, the processing circuitry 50 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 52 may be configured to access (e.g., write to and/or read from) memory 54, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 56, which is stored in, for example, memory 54 at the WD 22, or stored in external memory (e.g., database, storage array, network storage device, etc.) accessible by the WD 22. The software 56 may be executable by the processing circuitry 50. The software 56 may include a client application 58. The client application 58 may be operable to provide a service to a human or non-human user via the WD 22, The client application 58 may interact with the user to generate the user data that it provides.

The processing circuitry 50 may be configured to control any of the methods and/or processes described herein and/or to cause such methods, and/or processes to be performed, e.g., by WD 22. The processor 52 corresponds to one or more processors 52 for performing WD 22 functions described herein. The WD 22 includes memory 54 that is configured to store data, programmatic software code and/or other information described herein. In some embodiments, the software 56 and/or the client application 58 may include instructions that, when executed by the processor 52 and/or processing circuitry 50, causes the processor 52 and/or processing circuitry 50 to perform the processes described herein with respect to WD 22. For example, the processing circuitry 50 of the wireless device 22 may include an indication unit 32 configured to perform one or more wireless device 22 functions as described herein such as with respect to managing interference from aggressor private networks.

Figure 4:
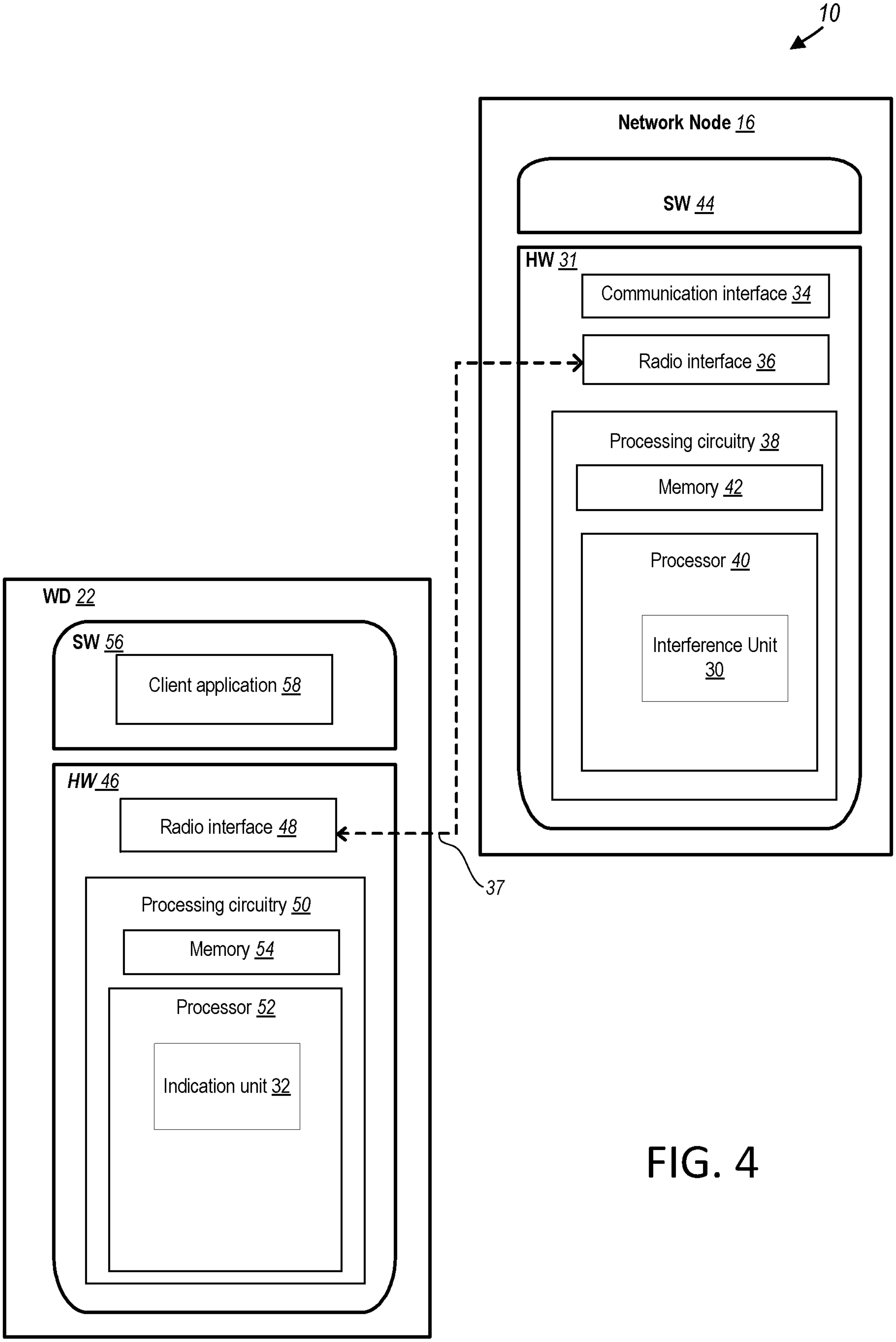
FIG. 4 is a block diagram of a various entities from FIG. 1 according to some embodiments of the present disclosure.

In some embodiments, the inner workings of the network node 16 and WD 22 may be as shown in FIG. 4 and independently, the surrounding network topology may be that of FIG. 3. The wireless connection 37 between the WD 22 and the network node 16 is in accordance with the teachings of the embodiments described throughout this disclosure.

Although FIGS. 3 and 4 show various "units" such as interference unit 30, and indication unit 32 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 5 is a flowchart of an exemplary process in a network node 16 according to some embodiments of the present disclosure. One or more Blocks and/or functions performed by network node 16 may be performed by one or more elements of network node 16 such as by interference unit 30 in processing circuitry 38, processor 40, radio interface 36, etc. In one or more embodiments, network node 16 such as via one or more of processing circuitry 38, processor 40, communication interface 34 and radio interface 36 is configured to receive (Block S100) transmission of random access (RA) signaling from a wireless device 22 where the RA signaling is configured to indicate that the first network node 16 is causing interference at the wireless device 22, as described herein. In one or more embodiments, network node 16 such as via one or more of processing circuitry 38, processor 40, communication interface 34 and radio interface 36 is configured to cause (Block S102) an action to reduce the interference based on the indication that the first network node 16 is causing interference, as described herein.

According to one or more embodiments, the processing circuitry 38 is further configured to identify a cause of the interference based at least in part on the RA signaling where the action is based on the identified cause of the interference. According to one or more embodiments, the action includes one of: adapting transmission on a plurality of resources, adapting a frequency of allocation of a plurality of resources in one of a time domain and frequency domain, and adapting transmission on a plurality of resources over a time period. According to one or more embodiments, the RA signaling indicates that a plurality of network nodes are causing interference at the wireless device where the plurality of network nodes 16 includes the first network node 16.

According to one or more embodiments, the RA signaling corresponds to one of physical random access channel, PRACH, and physical uplink shared channel, PUSCH, signaling in a RA process. According to one or more embodiments, the RA process is one of a 2-step RA process and 4-step RA process. According to one or more embodiments, the processing circuitry 38 is further configured to skip an acknowledgement step for acknowledging the one of PRACH signaling and PUSCH signaling in the RA process. According to one or more embodiments, the processing circuitry 38 is further configured to skip a last step of one of the 2-step RA process and 4-step RA process. According to one or more embodiments, the wireless device 22 in not in a radio resource control (RRC) connected state with the first network node 16.

FIG. 6 is a flowchart of an exemplary process in a wireless device 22 according to some embodiments of the present disclosure. One or more Blocks and/or functions performed by wireless device 22 may be performed by one or more elements of wireless device 22 such as by indication unit 32 in processing circuitry 50, processor 52, radio interface 48, etc. In one or more embodiments, wireless device such as via one or more of processing circuitry 50, processor 52 and radio interface 48 is configured to cause (Block S104) transmission of random access (RA) signaling to a first network node where the RA signaling is configured to indicate that the first network node is causing interference at the wireless device, as described herein.

According to one or more embodiments, the processing circuitry 50 is further configured to receive, from the serving network node 16, a message triggering the transmission of the RA signaling to the first network node 16, the message including an identifier associated with the first network node 16. According to one or more embodiments, the processing circuitry 50 is further configured to: autonomously monitor a signal reception from the first network node, and determine whether the signal reception meets an aggressor criterion where the transmission of RA signaling to the first network node 16 is based on the signal reception meeting the aggressor criterion. According to one or more embodiments, the processing circuitry 50 is further configured to: receive, from the serving network node 16, a message that triggers monitoring of signal reception associated with the first network node 16, monitor the signal reception from the first network node based on the message, and determine whether the signal reception meets an aggressor criterion based on the monitoring of the signal reception where the transmission of RA signaling to the first network node 16 is based on the signal reception meeting the aggressor criterion.

According to one or more embodiments, the aggressor criterion includes an interference level where the aggressor criterion is met if the interference level is met. According to one or more embodiments, the monitoring includes monitoring of a plurality of signal receptions associated with of a plurality of network nodes 16 including the first network node 16 where the processing circuitry 50 is further configured to: determine that each of the plurality of signal receptions meets the aggressor criterion, and cause transmission of RA signaling to each of the plurality of network nodes 16. The RA signaling is configured to indicate that the plurality of network nodes are causing interference and be used by each of the plurality of network nodes 16 to determine whether to perform an action to reduce the interference. According to one or more embodiments, the RA signaling corresponds to one of physical random access channel, PRACH, signaling and uplink shared channel, PUSCH, signaling in a RA process.

According to one or more embodiments, the RA process is one of a 2-step RA process and 4-step RA process. According to one or more embodiments, an acknowledgement step for acknowledging the one of PRACH signaling and PUSCH signaling in the RA process is skipped. According to one or more embodiments, a last step of one of the 2-step RA process and 4-step RA process is skipped.

According to one or more embodiments, the RA signaling includes at least one of a cell identifier of the first network nod 16*e* and resource coordination information for interference mitigation. The resource coordination information for interference mitigation includes one of: information of a set of radio resources over which interference is received from the first network node 16, information of a set of radio resources over which the first network node 16 is recommended to reduce interference toward the wireless device 22, and information of a time period over which the wireless device 22 is expected to be served, by the serving network node 16, on a set of radio resources. According to one or more embodiments, the wireless device 22 in not in a radio resource control (RRC) connected state with the first network node 16. According to one or more embodiments, the RA signaling is configured to be used by the first network node 16 to determine whether to perform an action to reduce the interference. According to one or more embodiments, the transmission is to the first network node 16 is a direct transmission to the first network node 16.

Having generally described arrangements for managing interference from aggressor private networks, details for these arrangements, functions and processes are provided as follows, and which may be implemented by the network node 16 and/or wireless device 22. Embodiments provide managing interference from aggressor private networks.

Scenario Description

An example scenario includes at least one wireless device 22 (UE1) served by a first cell (cell1) which is managed or operated by a first network node 16 (NN1), which belongs to a first network 12 (NW1). Cell1 operates on a first carrier frequency (F1). In one example, NW1 may be a private network 12 or local network 12, referred to herein as a first private network (PN1). In this example, PN1 operates in a localized area or geographical region or in indoor, e.g., in an office premises, shopping mall, etc. In another example, NW1 is a traditional network, in which case NW1 can operate in any region where the operator owns the licensed for operating F1.

The example scenario further includes at least a second private network 12 (PN2). At least one second cell 18 (cell2) on a second carrier frequency (F2) is operated or served or managed by a second network node 16 (NN2), which in turn belongs to PN2. The carriers F1 and F2 are related to each, and the coverage of cell1 and cell2 are related to each other as described below:

The carriers F1 and F2 are related in that they at least partially overlap with respect to each other in the frequency domain. As a special case:

- In one example, F1 and F2 fully overlap with each other, i.e., F1 and F2 are identical. For example, they have the same center frequency and the same bandwidth. More specifically F1=F2.
- In another example, F1 and F2 have the same or substantially the same center frequencies but their respective bandwidths (BWs) are different. In the latter case, the difference may be in order of frequency error, e.g., in order of ±0.1 ppm.
- In yet another example, F1 and F2 have different or substantially different center frequencies, but their respective BWs may or may not be the same. However, at least part of their respective BWs overlap with each other.

Figure 7:
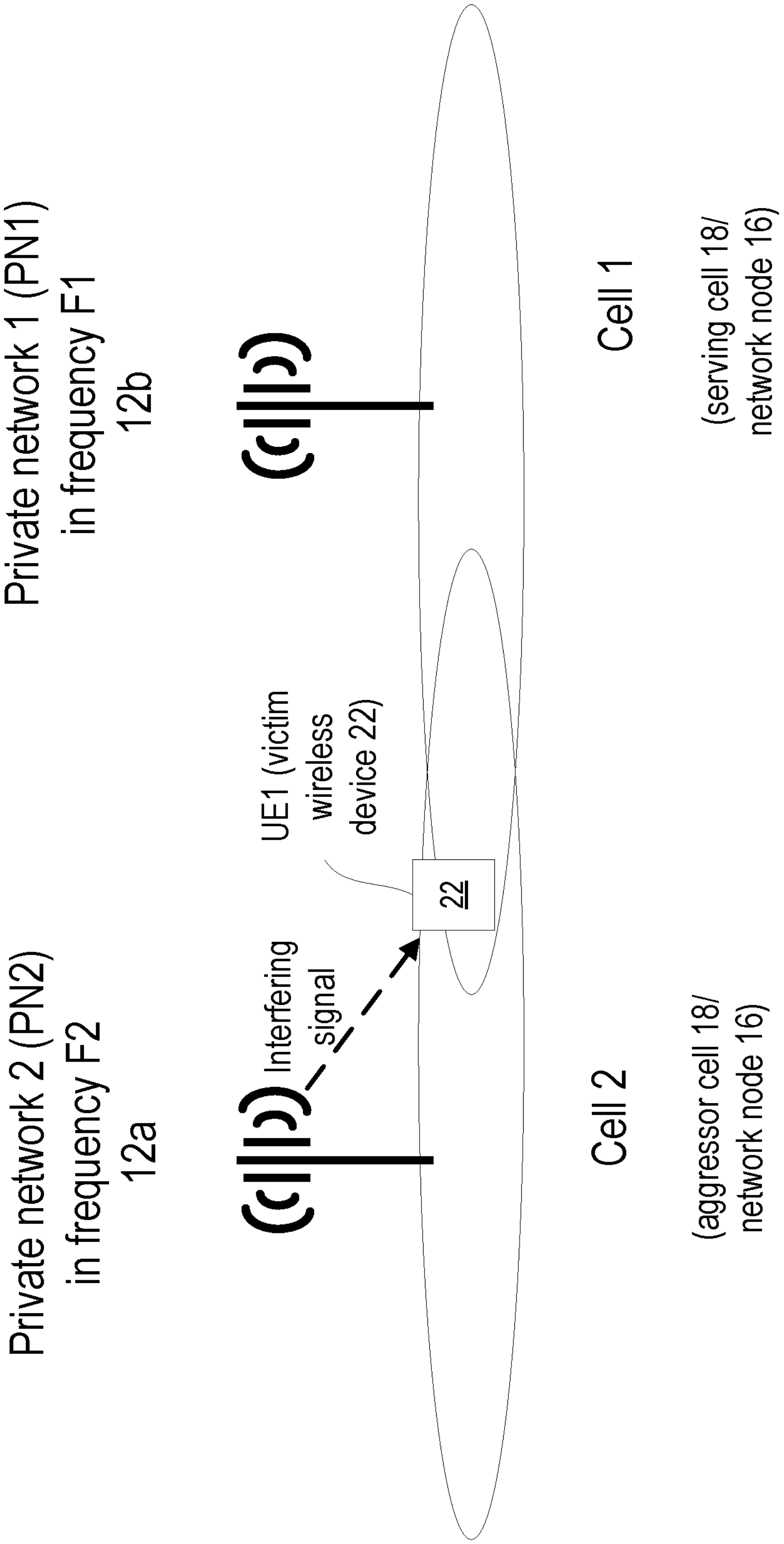
FIG. 7 is a diagram of a scenario of private networks in local licensed spectrum according to some embodiments of the present disclosure.

The coverage of cell1 and cell2 are related in that their coverage at least partially overlap with respect to each other. This implies that a wireless device 22 in the overlapping coverage area receives signals from both cell1 served by NN1 and cell2 served by NN2. For example, the victim wireless device 22 (UE1) served by cell1 also receives signals of cell2. Cell2 is therefore an aggressor cell for the victim wireless device 22 and the corresponding signal from cell2 is called as interfering signal or aggressor signal or simply interference, where, for example, the interfering signal may be located in the same channel or adjacent channel as the channel used by the victim wireless device 22. This scenario is illustrated in FIG. 7 that is a diagram of private networks in local licensed spectrum.

Embodiment 1: Wireless Device 22 Screaming Signaling to Aggressor Private Networks In the following section, a random access channel (RACH) based wireless device screaming signal is described. The example arrangement may include one or more of the following steps or stages:

Triggering Condition in a Victim Wireless Device 22 to Initiate Determining Aggressor Cell(s) 18/Network Node(s) 16 in PN2

A victim wireless device 22 (e.g., UE1) operating in NW1 determines, such as via one or more of processing circuitry 50, processor 52, radio interface 48, indication unit 32, etc., at least one aggressor cell (e.g., cell2 in PN2) when one or more triggering conditions are met. Examples of triggering conditions or mechanisms or criteria or aggressor criterion may include one or more of the following:

1. Wireless device 22 upon receiving, such as via one or more of processing circuitry 50, processor 52, radio interface 48, indication unit 32, etc., an explicit message from a network node 16 (e.g., from its serving cell (cell1) or serving network node 16) requesting the wireless device 22 to determine at least one potential aggressor cell. For example, the network node 16 (e.g., serving cell) may determine, such as via one or more of processing circuitry 38, processor 40, radio interface 36, interference unit 30, etc., that the wireless device 22 signal reception level is worse than a certain/predefined threshold. When this condition is met, the network node 16 sends, such as via one or more of processing circuitry 38, processor 40, radio interface 36, interference unit 30, etc., a request to the wireless device 22 to determine at least one potential aggressor cell. In one example, the wireless device 22 signal reception level is worse than certain threshold provided that the wireless device 22's signal quality and/or signal strength are below their respective thresholds. In another example, the wireless device 22 signal reception level is worse than certain threshold provided that the BLER (e.g., HARQ BLER) of the signal received by the wireless device 22 from the serving is above certain threshold. In one example, the network node 16 obtains such as via one or more of processing circuitry 38, processor 40, radio interface 36, interference unit 30, etc., information about the wireless device 22 signal reception level based on message received from the network node 16, e.g., results of the measurement report. In another example, the network node 16 obtains such as via one or more of processing circuitry 38, processor 40, radio interface 36, interference unit 30, etc., information about the wireless device 22 signal reception level autonomously, e.g., based on HARQ feedback signals (e.g., ACK/NACK), corresponding to DL data reception, sent by the wireless device 22 to the network node 16.

2. Wireless device 22 upon autonomously determining, such as via one or more of processing circuitry 50, processor 52, radio interface 48, indication unit 32, etc., that the wireless device 22 signal reception level is worse than a certain threshold (e.g., signal level and/or interference level, which may be part of an aggressor criterion). The examples for determining whether the wireless device signal reception level is worse than or does not met a certain threshold or not (e.g., signal level and/or interference level, which may be part of an aggressor criterion), may be the same as described above in triggering condition #1.

3. Wireless device 22 upon receiving, such as via one or more of processing circuitry 50, processor 52, radio interface 48, indication unit 32, etc., an explicit message from a network node 16 (e.g., from its serving network node 16/serving cell, cell1) containing information about at least one aggressor cell. The information may include, for example, cell ID of the aggressor cell. The information may further include additional information of the aggressor cell, e.g., PLMN ID, cell global ID (CGI), an identifier or an indicator associated with the aggressor's private network, etc. In this arrangement, the network node 16 determines, such as via one or more of processing circuitry 38, processor 40, radio interface 36, interference unit 30, etc., the aggressor cell, for example based on information received from another node, e.g., another wireless device 22 (UE2) located close to the wireless device 22 to whom the message is sent.

Victim Wireless Device 22 Determining Aggressor Cell (s) 18/Network Node(s) 16

In response to meeting one or more of the above triggering conditions, i.e., meeting an aggressor criterion, the wireless device 22 determines, such as via one or more of processing circuitry 50, processor 52, radio interface 48, indication unit 32, etc., at least one potential aggressor cell, e.g., cell2. In cases of arrangement/triggering condition #3, the wireless device 22 may be provided with information to directly send a RACH message to one or more aggressor cells, i.e., to one or more aggressor network nodes 16. In cases of arrangement/triggering conditions #1 or 2, the wireless device 22 determines, such as via one or more of processing circuitry 50, processor 52, radio interface 48, indication unit 32, etc., the aggressor cell 18/network node 16 by comparing at least the received signal levels at the wireless device 22 from one or more neighbor cells with a threshold. If the received signal level of any neighbor cell is above the threshold (H) (e.g., aggressor criterion of RSRP>H1 and/or RSRQ>H2, etc.) then the wireless device 22 may assume that the neighbor cell is potentially an aggressor cell 18/network node 16.

The wireless device 22 may further read, such as via one or more of processing circuitry 50, processor 52, radio interface 48, indication unit 32, etc., system information (e.g., one or more SIBs) of that neighbor cell to determine whether that cell (e.g., cell2) belongs to PN2 and/or it does not belong to NW1. The system information (SI) acquisition enables/allows/configures the wireless device 22 to determine an identifier of the network to which cell2 belongs. Examples of such identifiers are PLMN ID, CGI or any other ID (unique or temporary) which can uniquely identify the network, e.g., NW1, PN1, PN2 etc. If, based on the determined identifier of the network, it is determined that cell2 belongs to PN2 or does not belong NW1, then the wireless device 22 considers cell2 as an aggressor cell 18/network node 16. Otherwise, the wireless device 22 does not consider cell2 as an aggressor cell.

In cases where the wireless device 22 determines, such as via one or more of processing circuitry 50, processor 52, radio interface 48, indication unit 32, etc., more than one aggressor cells then, in one example, the wireless device 22 may apply such as via one or more of processing circuitry 50, processor 52, radio interface 48, indication unit 32, etc., the mitigation procedure (as described below) for all the determined aggressor cells (e.g., cell21, cell22, cell23 etc.). In another example the UE may apply such as via one or more of processing circuitry 50, processor 52, radio interface 48, indication unit 32, etc., the mitigation procedure (i.e., transmit one or more screaming signals) for subset of the determined aggressor cells 18/network nodes 16 (e.g., only for cell2 and cell21, etc.). In one or more embodiments, the subset may include only one cell, e.g., cell2. This may also be referred to as the strongest or dominant aggressor cell 18/network node 16. In one example, the aggressor criteria used to select the subset of the aggressor cells includes selecting the cell whose received signal levels are the largest among all the identified aggressor cells.

Victim Wireless Device 22 Transmitting Screaming Signal to Aggressor Cell(s) 18/Network Node(s) 16

While reading the SI of the aggressor cell(s) 18, the victim wireless device 22 may further determine, such as via one or more of processing circuitry 50, processor 52, radio interface 48, indication unit 32, etc., that time-frequency resources in the aggressor cell(s) where the wireless device 22 can send/transmit a screaming signal for interference mitigation as described below.

A victim wireless device 22 may then initiate, such as via one or more of processing circuitry 50, processor 52, radio interface 48, indication unit 32, etc., a random access (RA) transmission such as a RACH transmission but towards or with at least one identified aggressor cell. The RA message includes an aggressor identifier (ID), e.g., physical cell ID (PCI), and radio resource coordination information (RCI). Examples of RCI include one or more of:

- Information about a set of interfering radio resource over which the victim wireless device 22 receives interference from the aggressor cell 18/aggressor network node 16;
- Recommended pattern of radio resources including at least a first set of radio resources over which the aggressor cell 18 (i.e., aggressor network node 16) is recommended to reduce interference towards the victim wireless device 22 and a second set of radio resources over which the aggressor cell 18 is allowed to transmit signals without any constraints.
- The time period or duration (Tperiod) over which the wireless device 22 is expected to be served on the indicated radio resources starting from a reference time. For example, Tperiod can be expressed as X1 seconds, X2 slots, X3 frames, X4 SFN cycles, etc. Examples of reference time are SFN, global time (e.g., UTC, GPS time etc.), X5 slots after receiving the screaming message, etc.

Figure 8:
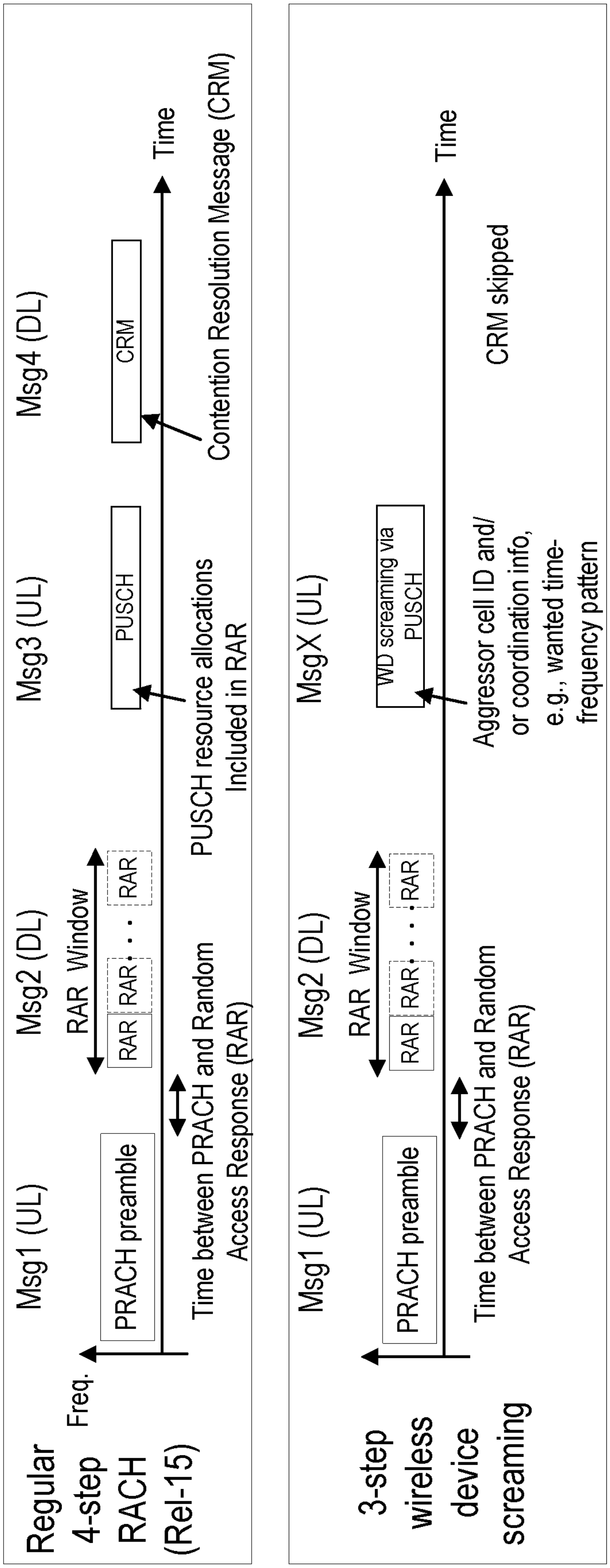
FIG. 8 is a diagram of one example of a wireless device screaming signal according to some embodiments of the present disclosure.

Two different methods of RACH are defined which may depend on 3GPP Rel-15 or Rel-16 specification capability:

The first method of RACH is 3-step wireless device 22 screaming as illustrated in FIG. 8 where the aggressor private network (i.e., aggressor network node 16 or aggressor cell 18) is operating at the same or adjacent frequency channel as the victim wireless device 22. When a victim wireless device 22 discovers, such as via one or more of processing circuitry 50, processor 52, radio interface 48, indication unit 32, etc., an aggressor cell 18, the victim wireless device 22 initiates such as via one or more of processing circuitry 50, processor 52, radio interface 48, indication unit 32, etc., a 3-step screaming transmission to communicate with the aggressor cell.

As shown in FIG. 8, the 3-step screaming transmission is similar to 4-step RACH. After the Msg 1 and Msg 2 steps are completed, the victim wireless device 22 sends, such as via one or more of processing circuitry 50, processor 52, radio interface 48, indication unit 32, etc., a screaming signal/message instead of regular Msg 3 (i.e., instead of Msg 3 illustrated in Regular 4-step RACH). The screaming signal/message is referred to as 'Msg X' in FIG. 8 and provides, via RA signaling, an indication that at least a first network node (i.e., aggressor cell 18/network node 16) is causing interference at victim wireless device 22. The Msg X may include basic information for distributed interference coordination with the aggressor network node 16/cell 18. As a non-limiting example, the basic information can be aggressor cell ID and/or coordination information. The coordination information can be the RCI, e.g., time-frequency resource where victim wireless device 22 receives excessive interference from the aggressor cell 18/network node 16. Further, aggressor cell 18/network node 16 may use the information and/or indication provided by Msg X to determine whether to perform at least one action to mitigate and/or reduce interference caused by the aggressor cell 18/network node 16. Once the aggressor cell 18/network node 16 detects, such as via one or more of processing circuitry 38, processor 40, radio interface 36, interference unit 30, etc., the Msg X, the aggressor cell 18/network node 16, in one or more embodiments, will skip sending contention resolution message (CRM) included in the regular Msg 4 since the wireless device screaming signal does not need this acknowledgement from the aggressor cell, i.e., at least one step or the last step in the RACH process is skipped or omitted such as via one or more of processing circuitry 38, processor 40, radio interface 36, interference unit 30, etc.

Figure 9:
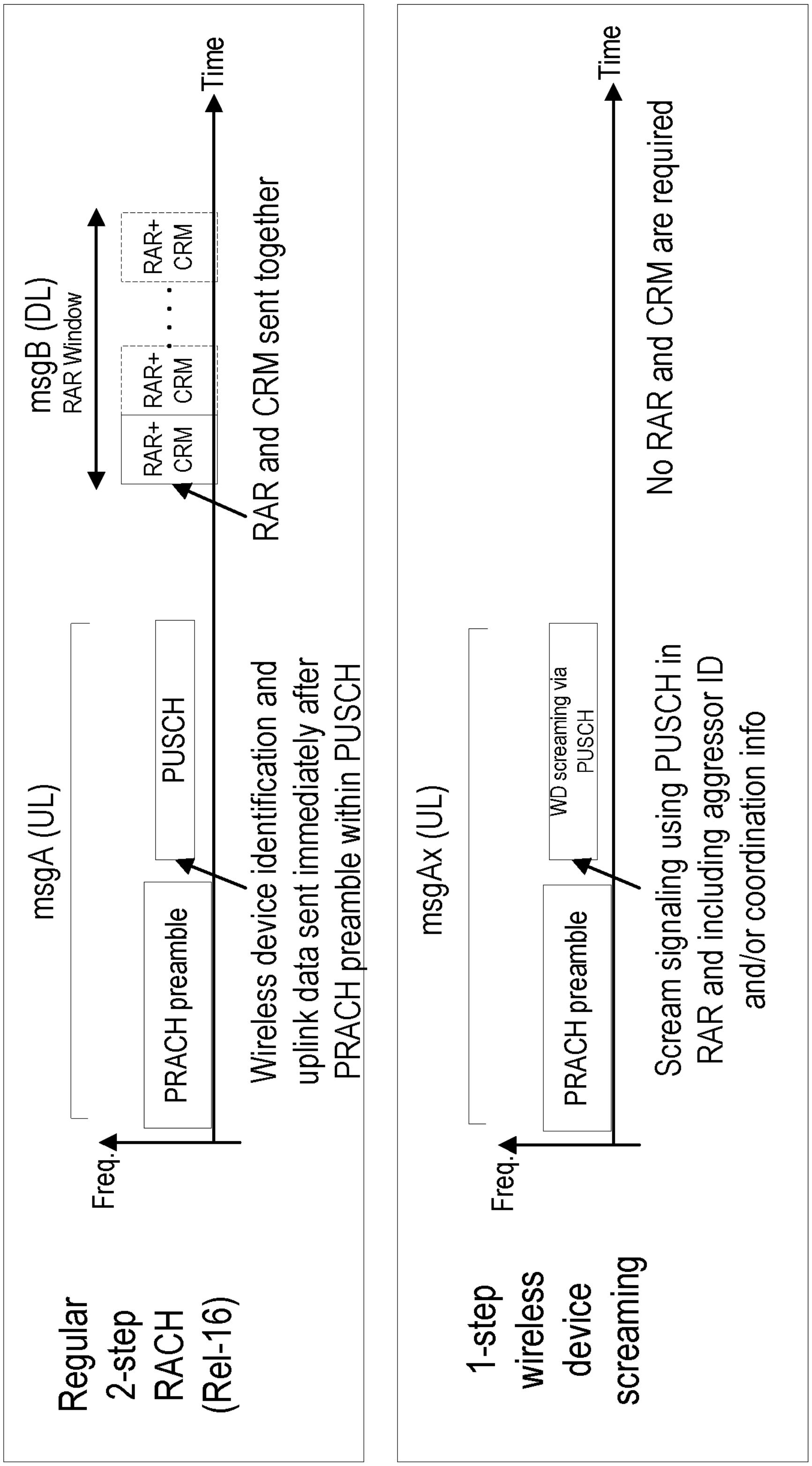
FIG. 9 is a diagram of another example of a wireless device screaming signal according to some embodiments of the present disclosure.

Referring to FIG. 9, the second method provides for a 1-step wireless device 22 screaming which is able to send a screaming signal in the faster manner at least when compared to the 3-step wireless device 22 screaming method. FIG. 9 is a diagram of this second method of a 1-step wireless device 22 screaming signal to aggressor private network(s) operating in the same or adjacent frequency channel of/to victim wireless device 22. 1-step wireless device 22 screaming is different from the 2-step RACH method from 3GPP Rel-16 (e.g., TS 38.213 v16.1.0. Similar to the 3-step wireless device 22 screaming, an aggressor ID and/or coordination information is included in a new and/or modified message that is transmitted to the aggressor network node 16. This new message is referred to as Msg Ax in FIG. 9 and provides, via RA signaling, an indication that at least a first network node (i.e., aggressor cell 18/network node 16) is causing interference at victim wireless device 22. Once Msg Ax is received by the aggressor cell 18/network node 16 such as via one or more of processing circuitry 38, processor 40, radio interface 36, interference unit 30, etc., msg B of the regular 2-step RACH may be skipped, i.e., at least one step and/or a last step of a RACH process is skipped. Further, aggressor cell 18/network node 16 may use such as via one or more of processing circuitry 38, processor 40, radio interface 36, interference unit 30, etc., the information and/or indication provided by MsgAx to determine whether to perform at least one action to mitigate and/or reduce interference caused by the aggressor cell 18/network node 16.

If the victim wireless device 22 is not served by cell 1 or is not served on the radio resources which were indicated in the RCI information in the screaming message, then the victim wireless device 22 may further inform such as via one or more of processing circuitry 50, processor 52, radio interface 48, indication unit 32, etc., the aggressor cell 18/network node 16 about the change in the victim wireless device 22's status. For example, the victim wireless device 22 may send such as via one or more of processing circuitry 50, processor 52, radio interface 48, indication unit 32, etc., another screaming message to the aggressor cell 18/network node 16 indicating that the RCI information is no more valid. In another example, the wireless device 22 may send such as via one or more of processing circuitry 50, processor 52, radio interface 48, indication unit 32, etc., another screaming message to the aggressor cell 18/network node 16 indicating that the RCI information has changed.

Embodiment 2: Aggressor Network Node 16 Reception of Victim Wireless Device 22 Screaming One or more behaviours/actions of an aggressor network node 16 may be performed such as via one or more of processing circuitry 38, processor 40, radio interface 36, interference unit 30, etc., when the aggressor network node 16 (e.g., NN2, also referring to network node 16 in PN2, etc.) receives the wireless device 22 screaming message. The aggressor network node 16 (e.g., NN2) may first identify such as via one or more of processing circuitry 38, processor 40, radio interface 36, interference unit 30, etc., condition(s) when the aggressor network node 16 creates excessive interference towards the victim wireless device 22. For example, the aggressor network node 16 may schedule multiple of its serving wireless devices 22 (e.g., UE2) with different beamforming codebooks or time-frequency resources compared to the time-frequency resources used for scheduling prior to receiving the screaming message. Thus, identifying such as via one or more of processing circuitry 38, processor 40, radio interface 36, interference unit 30, etc., condition(s) that the aggressor network node 16 generates excessive interference to the victim wireless device 22 may help avoid unnecessary performance degradation of the aggressor network.

To help identify the condition(s), the coordination information received from the victim wireless device 22's screaming signal/message can also include information to indicate when the victim wireless device 22 gets too high interference, e.g., time-frequency resource index. Once the aggressor network node 16 (e.g., gNB) identifies such as via one or more of processing circuitry 38, processor 40, radio interface 36, interference unit 30, etc., the interfering condition(s), the aggressor network node 16 can reduce, such as via one or more of processing circuitry 38, processor 40, radio interface 36, interference unit 30, etc., the interference level specific to the victim wireless device 22 by adapting one or more of its transmissions on the resources indicated by the victim wireless device 22, e.g., by reducing the transmit power, by not allocating or infrequently allocating certain resources in frequency, by not allocating or infrequently allocating certain resources in time domain, etc. The aggressor network node 16 may apply such as via one or more of processing circuitry 38, processor 40, radio interface 36, interference unit 30, etc., the interference mitigation, e.g., adapting one or more of its transmissions, over the indicated time period (e.g., Tperiod).

Embodiment 3: Victim Wireless Device 22 Screaming for Multi Aggressors

This embodiment provides use of a wireless device screaming signal when a victim wireless device 22 detects, such as via one or more of processing circuitry 50, processor 52, radio interface 48, indication unit 32, etc., multiple dominant aggressor network nodes 16. For example, in one or more embodiments, the wireless device 22 sends, such as via one or more of processing circuitry 50, processor 52, radio interface 48, indication unit 32, etc., screaming signals over a different time instance separately in each of the aggressor cells 18/network nodes 16, e.g., at time instance T1 in cell2 and at time instance T2 in cell1, etc. In another example, the wireless device 22 sends, such as via one or more of processing circuitry 50, processor 52, radio interface 48, indication unit 32, etc., the screaming signal only to one of the pluralities of the aggressor cells 18/network nodes 16, e.g., cell2. However, in this case, the wireless device 22 (i.e., victim wireless device 22) includes aggressor IDs of all the identified aggressor cells 18/network nodes 16 in the same screaming message sent to one of the aggressor cells 18.

In one or more embodiments, the screaming message may further include the interference coordination information (e.g., RCI) for all the aggressor cells 18/network nodes 16. The criteria for selecting, such as via one or more of processing circuitry 50, processor 52, radio interface 48, indication unit 32, etc., the aggressor cell 18/network node 16 for sending the screaming signal may be based on, for example, a cell 18 whose received signal level is largest/greatest among all the aggressor cells 18/network nodes 16, i.e., associated with the aggressor criterion being met. This arrangement may be used, for example, when the magnitude of the difference between the propagation delays between the wireless device 22 and the aggressor cells 18/network nodes 16 is within a predetermined margin. In one or more embodiments, the wireless device 22 power consumption is reduced by avoiding sending the screaming message in the multiple aggressor cells. In this case, the aggressor cell 18/network node 16 receiving the screaming message may convey the received message to other network nodes 16 within PN2. One or more network nodes 16 receiving the message, i.e., screaming signal, may then apply one or more action such as one or more interference mitigation techniques in the indicated resources where the victim wireless device 22 receives the interference, as described herein.

While Embodiments 1-3 above are described separately, two or more of Embodiments 1-3 may be combined such that steps/processes in these two or more embodiments are performed as described herein.

Therefore, the teachings described herein provide for one or more methods for a low-complexity wireless device 22 screaming signaling towards aggressor cell(s) 18/network node(s) 16 in surrounding private networks operating in co-/adjacent frequency channel, e.g., operating in a local licensed spectrum. One or more embodiments described herein do not require any pre-connection establishment between victim wireless device 22 and aggressor networks (i.e., aggressor cell(s) 18/network node(s) 16) such that, for example, victim wireless device 22 does not have to be in an RRC connected state with the one or more aggressor network nodes 16/cells 18 for interference mitigation, and can be scalable and fully distributed without a central architecture.

Further, the teachings of the instant disclosure provide for one or more of the following advantages:

- enables and/or allows and/or provides the victim private network to establish direct communication with aggressor private networks via a wireless device in local licensed spectrum for the purpose of private interference management.
- enables and/or allows and/or provides efficient interference management in local licensed spectrum based on explicit signaling thru a wireless device
- does not require high-layer signaling and cross-network architectures such that the teachings described herein are scalable
- provides a low-complex method to enable fast signaling for local interference management among private networks.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A wireless device that is configured to communicate with a serving network node, the wireless device comprising:

processing circuitry configured to cause transmission of random access (RA) signaling to a first network node, the RA signaling configured to indicate that the first network node is causing interference at the wireless device, wherein the processing circuitry is further configured to receive, from the serving network node, a message triggering the transmission of the RA signaling to the first network node, wherein the message includes an identifier associated with the first network node, wherein the RA signaling includes at least one of a cell identifier of the first network node and resource coordination information for interference mitigation.

2. The wireless device of claim 1, wherein the processing circuitry is further configured to:

autonomously monitor a signal reception from the first network node; and determine whether the signal reception meets an aggressor criterion, the transmission of RA signaling to the first network node being based on the signal reception meeting the aggressor criterion.

3. The wireless device of claim 2, wherein the aggressor criterion includes an interference level, the aggressor criterion being met if the interference level is met.

4. The wireless device of claim 3, wherein the interference level is met when the following one or more conditions are met:

power of the interference signal received at the wireless device is above interference threshold;

received signal quality at the wireless device is below signal quality threshold; and error rate of received signal at the wireless device is above error rate threshold.

5. The wireless device of claim 2, wherein the monitoring includes monitoring of a plurality of signal receptions associated with of a plurality of network nodes including the first network node; and the processing circuitry is further configured to:

determine that each of the plurality of signal receptions meets the aggressor criterion; and cause transmission of RA signaling to each of the plurality of network nodes, the RA signaling configured to:

indicate that the plurality of network nodes are causing interference; and be used by each of the plurality of network nodes to determine whether to perform an action to reduce the interference.

6. The wireless device of claim 1, wherein the processing circuitry is further configured to:

receive, from the serving network node, a message that triggers monitoring of signal reception associated with the first network node;

monitor the signal reception from the first network node based on the message; and determine whether the signal reception meets an aggressor criterion based on the monitoring of the signal reception, the transmission of RA signaling to the first network node being based on the signal reception meeting the aggressor criterion.

7. The wireless device of claim 1, wherein the RA signaling corresponds to one of physical random access channel (PRACH) signaling and uplink data channel signaling in a RA process.

8. The wireless device of claim 7, wherein the RA process is one of a 2-step RA process and 4-step RA process.

9. The wireless device of claim 8, wherein a last step of one of the 2-step RA process and 4-step RA process is skipped.

10. The wireless device of claim 7, wherein an acknowledgement step for acknowledging the one of PRACH signaling and PUSCH signaling in the RA process is skipped.

11. The wireless device of claim 1, wherein the resource coordination information for interference mitigation includes one of:

information of a set of radio resources over which interference is received from the first network node;

information of a set of radio resources over which the first network node is recommended to reduce interference toward the wireless device; and information of a time period over which the wireless device is expected to be served, by the serving network node, on a set of radio resources.

12. The wireless device of claim 1, wherein the wireless device is not in a radio resource control (RRC) connected state with the first network node.

13. The wireless device of claim 1, wherein the RA signaling is configured to be used by the first network node to determine whether to perform an action to reduce the interference.

14. The wireless device of claim 1, wherein the transmission is to the first network node is a direct transmission to the first network node.

15. A first network node, the first network node comprising:

processing circuitry configured to:

receive transmission of random access (RA) signaling from a wireless device, the RA signaling configured to indicate that the first network node is causing interference at the wireless device; and cause an action to reduce the interference based on the indication that the first network node is causing interference, wherein the RA signaling from the wireless device is received in response to a message sent from a serving network node triggering the transmission of the RA signaling to the first network node, wherein the message includes an identifier associated with the first network node, wherein the RA signaling includes at least one of a cell identifier of the first network node and resource coordination information for interference mitigation.

16. The first network node of claim 15, wherein the processing circuitry is further configured to identify a cause of the interference based at least in part on the RA signaling, the action being based on the identified cause of the interference.

17. The first network node of claim 15, wherein the action includes one of:

adapting transmission on a plurality of resources;

adapting a frequency of allocation of a plurality of resources in one of a time domain and frequency domain; and adapting transmission on a plurality of resources over a time period.

18. The first network node of claim 15, wherein the RA signaling indicates that a plurality of network nodes are causing interference at the wireless device, the plurality of network nodes including the first network node.

19. The first network node of claim 15, wherein the RA signaling corresponds to one of physical random access channel (PRACH) and physical uplink data channel signaling in a RA process.

* * * * *